United States Patent [19]
Backlund

[11] Patent Number: 6,147,326
[45] Date of Patent: Nov. 14, 2000

[54] SOLDERING DEVICE WITH A PLURALITY OF SPACED SOLDERING TIPS AND METHOD OF USE

[75] Inventor: David D. Backlund, Hanover, Minn.

[73] Assignee: Seagate Technology, Inc., Scotts Valley, Calif.

[21] Appl. No.: 09/329,566

[22] Filed: Jun. 10, 1999

Related U.S. Application Data

[60] Provisional application No. 60/101,874, Sep. 25, 1998.

[51] Int. Cl.[7] .................................................... B23K 3/02
[52] U.S. Cl. .................. 219/243; 219/85.1; 219/85.22; 228/180.1; 228/51
[58] Field of Search ...................... 219/243, 221, 219/525, 85.1, 85.22; 228/180.1, 180.21, 180.22, 51

[56] References Cited

U.S. PATENT DOCUMENTS

| | | | |
|---|---|---|---|
| 3,746,239 | 7/1973 | Auray | 228/51 |
| 3,786,228 | 1/1974 | Castellana et al. | 219/233 |
| 3,786,229 | 1/1974 | Hombrecher | 219/241 |
| 3,943,323 | 3/1976 | Smith et al. | 219/85.1 |
| 3,991,297 | 11/1976 | Ammann | 219/233 |
| 4,081,658 | 3/1978 | Ammann | 219/233 |
| 4,090,656 | 5/1978 | Sato et al. | 228/180.1 |
| 4,412,123 | 10/1983 | Ammann et al. | 219/233 |
| 4,431,903 | 2/1984 | Riccio | 219/238 |
| 4,795,076 | 1/1989 | Gottschild | 228/54 |
| 4,871,899 | 10/1989 | DuFrenne | 219/233 |
| 4,910,383 | 3/1990 | Zimmer | 228/180.1 |
| 4,918,277 | 4/1990 | Zimmer | 219/85.16 |
| 4,945,210 | 7/1990 | Yoshimura | 219/241 |
| 4,974,768 | 12/1990 | Ebata | 228/54 |
| 5,122,637 | 6/1992 | Bottorff et al. | 219/241 |
| 5,229,575 | 7/1993 | Waller et al. | 219/233 |
| 5,241,156 | 8/1993 | Wallgren et al. | 228/180.1 |
| 5,288,007 | 2/1994 | Interrante et al. | 228/180.21 |
| 5,446,262 | 8/1995 | McCambridge | 219/237 |
| 5,524,809 | 6/1996 | Kosslow et al. | 228/20.5 |
| 5,864,118 | 1/1999 | Backlund | 219/233 |

FOREIGN PATENT DOCUMENTS

| | | | |
|---|---|---|---|
| 1-266731 | 10/1989 | Japan | 228/51 |
| 412 133 | 11/1966 | Switzerland . | |

OTHER PUBLICATIONS

"Solder Tip" by H. Carl, IBM Technical Disclosure Bulletin, Bol. 10, No. 6, Nov. 1967.

*Primary Examiner*—John A. Jeffery
*Attorney, Agent, or Firm*—Westman, Champlin & Kelly, P.A.

[57] ABSTRACT

A soldering device includes an elongated hot bar and a plurality of spaced soldering tips supported along the hot bar for soldering multiple connections. A method of using the soldering device is also described.

13 Claims, 10 Drawing Sheets

SOLDERING DEVICE WITH A PLURALITY OF SPACED SOLDERING TIPS AND METHOD OF USE

CROSS-REFERENCE TO RELATED APPLICATION

This application claims priority to Provisional application Ser. No. 60/101,874, filed Sep. 25, 1998, and entitled "HOT BAR REFLOW SOLDERING".

FIELD OF THE INVENTION

The present invention relates to a soldering device for providing an electrical connection between connectors. In particular, the present invention relates to a soldering device for soldering a series of connectors with a single heating element.

BACKGROUND OF THE INVENTION

Disc drive systems are well known which operate and transmit data via electronic circuitry. To assemble a disc drive, electrical connections are made by soldering connectors to couple the circuitry of the disc drive for operation. In particular, a series of leads coupled to transducer elements of a head are soldered to conductive solder pads to connect to circuitry of the disc drive. The spacing between solder pads is very small requiring precision soldering.

Prior soldering devices include an elongated soldering bar for simultaneously soldering a series of head connections. During soldering operation, contact between an elongated soldering device and solder pads disperses solder from solder pads which can spill over shorting or interfering with the electrical connections between leads and circuitry of the disc drive or other circuitry. The present invention addresses these and other problems and offers other advantages over the prior art.

SUMMARY OF THE INVENTION

The present invention relates to a soldering apparatus and method for soldering a series of connections. The device includes an elongated hot bar formed of a relatively resistive material and coupleable to a power source to heat the elongated hot bar. The elongated hot bar includes a plurality of spaced soldering tips spaced along the hot bar for soldering multiple connections. The soldering tips provide a contact interface between a soldered element and solder pad which reduces significant solder flow which can short or interfere with electrical connections between the soldered element and the solder pad. In use, soldering tips supported by hot bar are aligned with a series of solder pads for soldering a series of connections. These and various other features as well as advantages which characterize the present invention will be apparent upon reading of the following detailed description and review of the associated drawings.

DETAILED DESCRIPTION OF THE PREFERRED EMBODIMENTS

Figure 1:
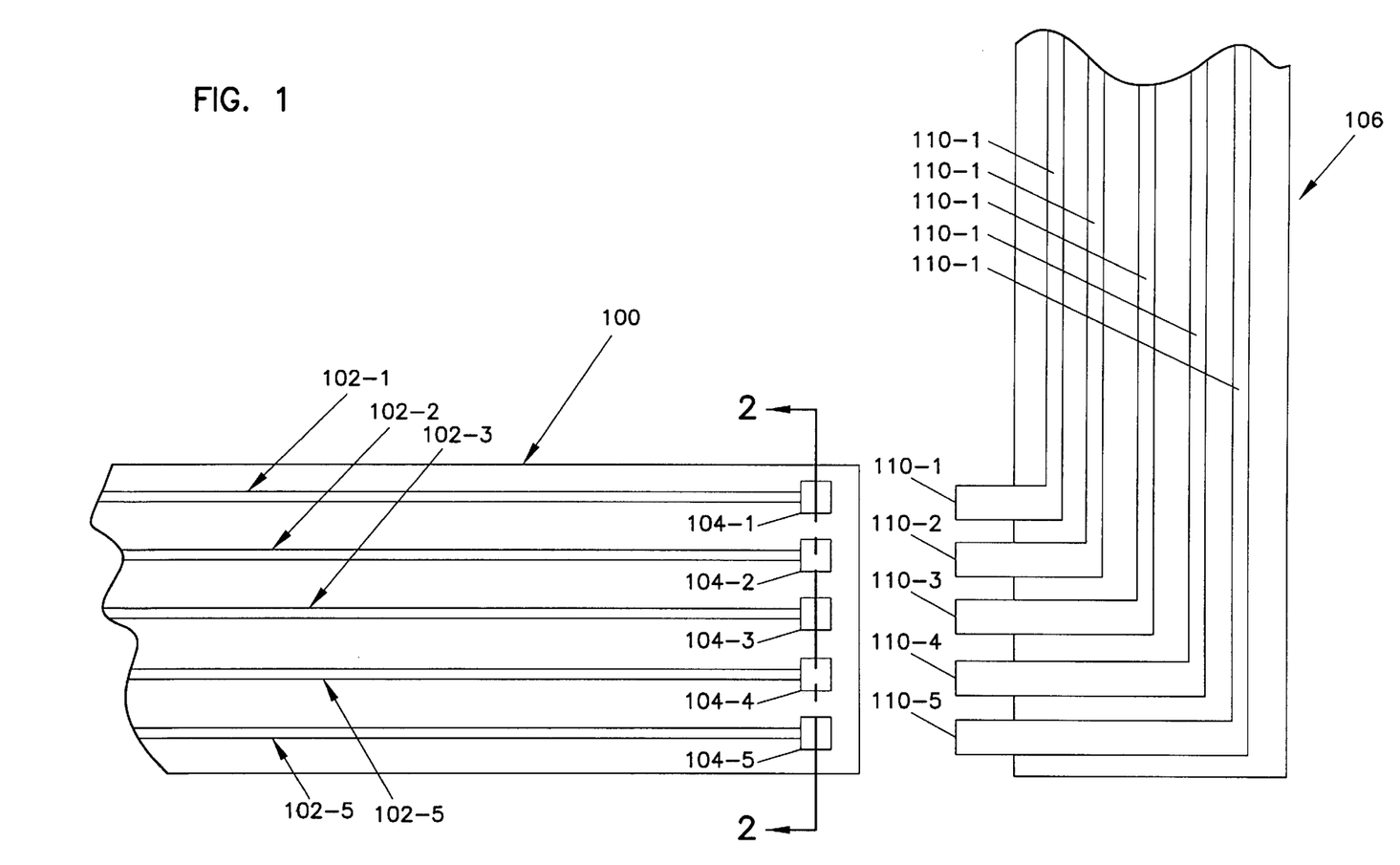
FIG. 1 is an illustration of first and second circuit portions having a series of connectors which are soldered to electrically connect the first and second circuit portions.

The present invention relates to a device for soldering a series of connectors to provide an electrical connection between separate circuit portions. FIG. 1 illustrates a first printed circuit portion 100 including a plurality of conductor paths 102-1–102-5 having a plurality of solder pads 104-1–104-5 coupled thereto, and a second printed circuit portion 106 including a plurality of conductor paths 108-1–108-5 coupled to a plurality of leads 110-1–110-5. As shown, solder pads 104 of circuit portion 100 are arranged in a series such that pads are spaced along a common axis and coupled to spaced conductive paths 102-1–102-5 along a printed circuit portion. Leads 110-1–110-5 are similarly arranged in a series and are spaced along a common axis and couple to conductor paths 108-1–108-5 of the second printed circuit portion 106. The leads 110-1–110-5 are soldered to solder pads 104-1–104-5 to provide a series of electrical connections between the paths 102, 108 of the first and second circuit portions.

Figure 2:
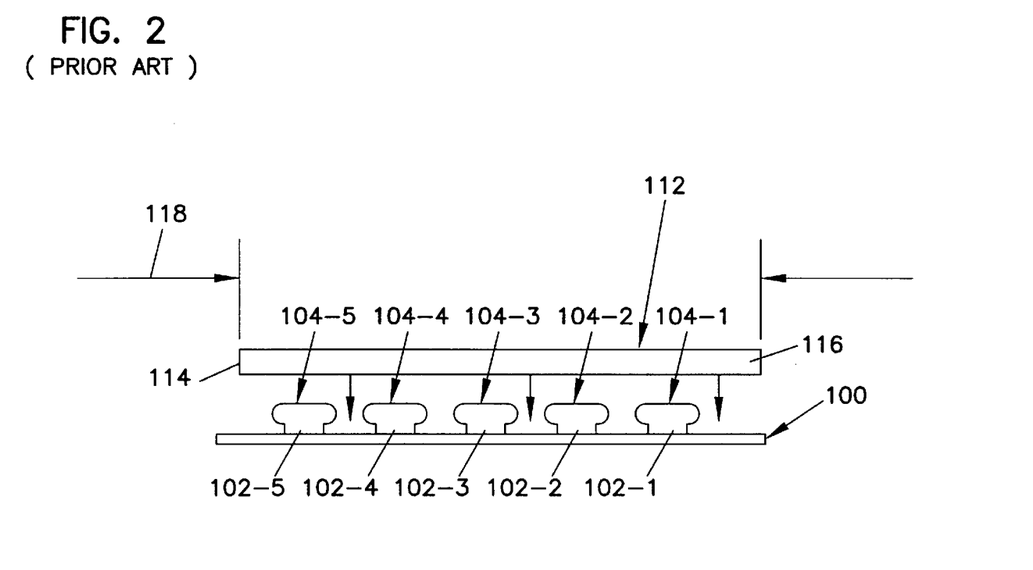
FIG. 2 is an illustration of solder pads of circuit portion 100 as view from line 2—2 of FIG. 1 with an elongated soldering bar shown above the solder pads.
Figure 3:
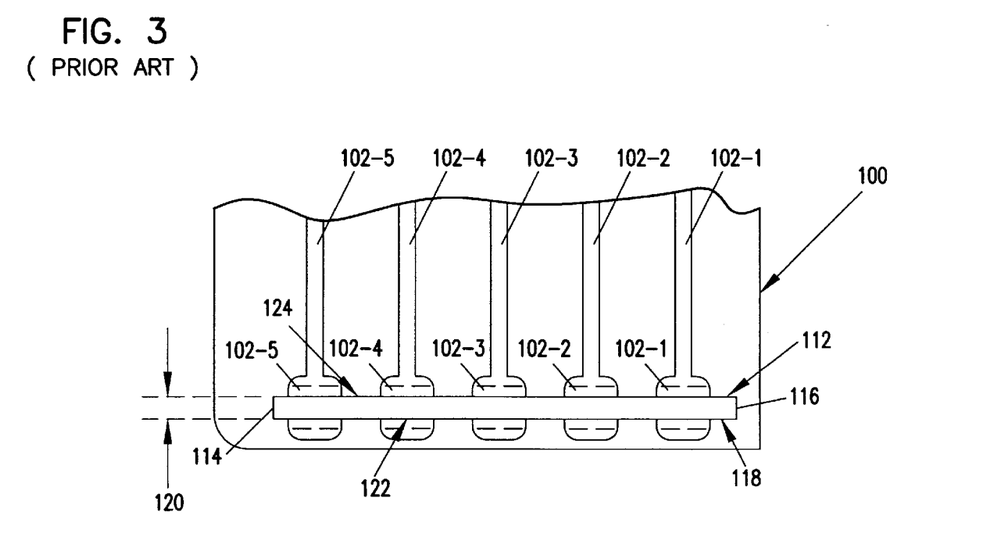
FIG. 3 is an illustrative view of an elongated soldering bar for soldering a series of leads to solder pads.

Prior devices solder a series of connections in a single soldering operation via an elongated soldering bar 112 as illustrated schematically in FIGS. 2–3. The elongated soldering bar 112 includes spaced opposed ends 114, 116, an elongated length 118 extending between ends 114, 116 and a transverse width 120 as shown in FIG. 3. For soldering operations, the length of the soldering bar is aligned with a plurality of spaced solder pads 104-1–104-5 as schematically illustrated in FIGS. 2–3 to provide an elongated soldering surface.

The elongated soldering surface of the soldering bar 112 engages an upper surface of the solder pads 104 as illustrated in FIG. 2 for soldering operation. Contact between the soldering bar 112 and solder pads 104 during soldering operation displaces solder from the solder pads 104 which generally flows or spills under sides 122, 124 of the elongated solder bar as shown in FIG. 3. The displaced solder can weaken the electrical connection between leads 110 and printed circuit portion 100 and can also interfere with or short the electrical connection between circuit portions 100, 106 if solder spills over between separate solder pads 104 or other conductive components because of the very small spacing between solder pads 104 and conductive components.

Figure 4:
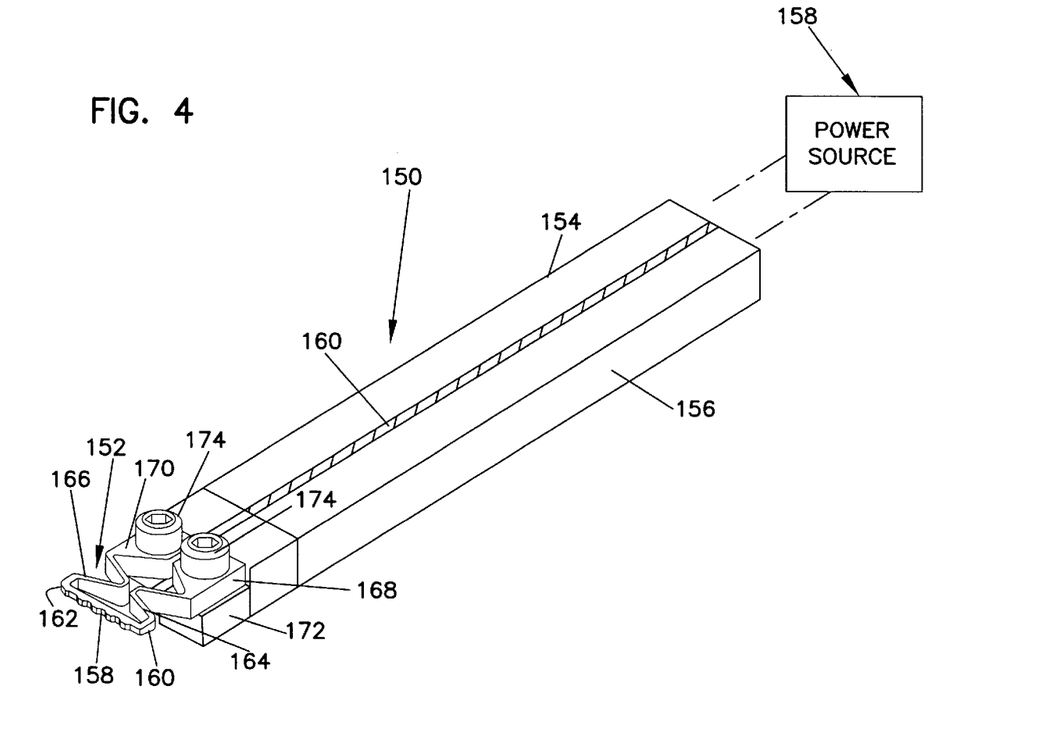
FIG. 4 is a perspective illustration of an embodiment of a soldering device of the present invention.
Figure 5:
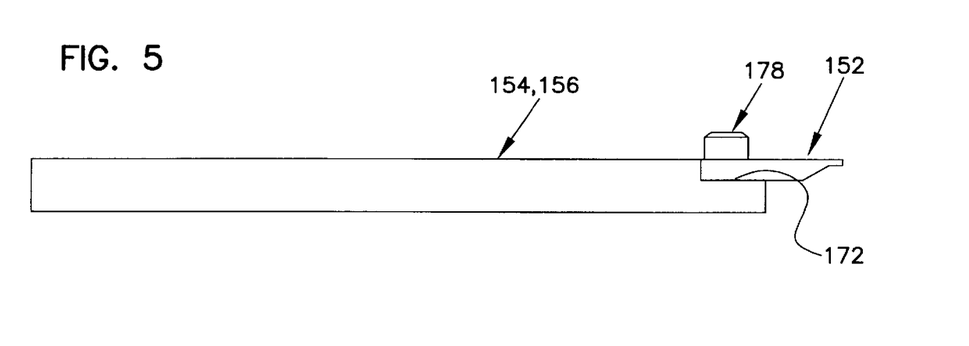
FIG. 5 is a side elevational view of the device of FIG. 4.
Figure 6:
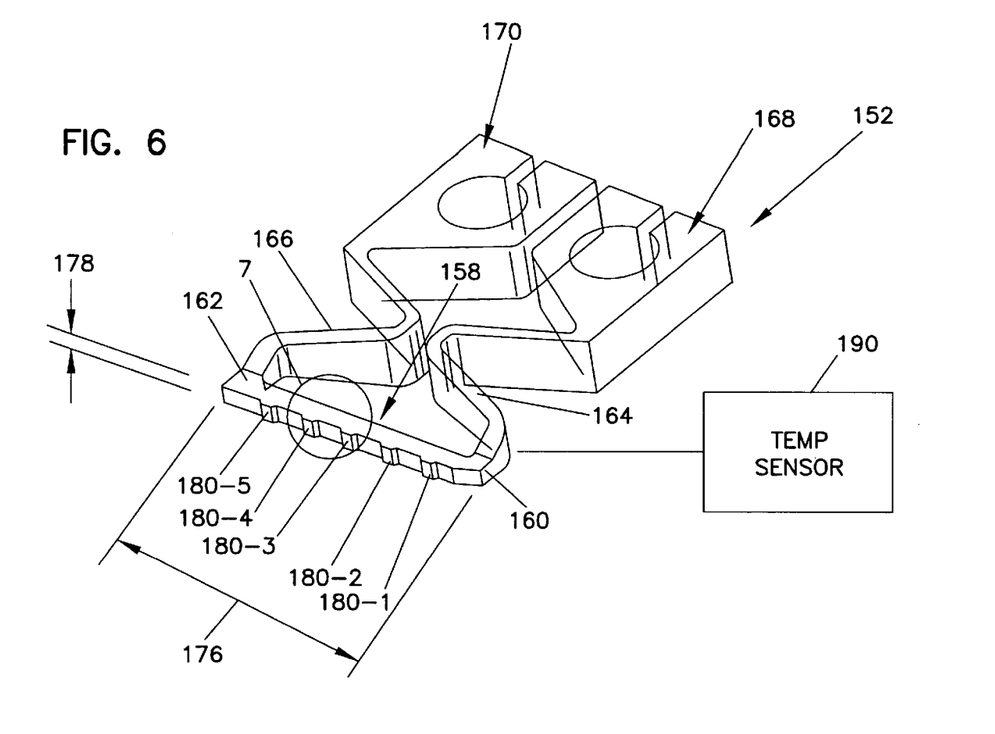
FIG. 6 is a detailed perspective view of a soldering portion of the soldering device shown in FIGS. 4–5.

FIGS. 4–6 illustrate an embodiment of a soldering device 150 of the present invention. Soldering device 150 includes a soldering portion 152 connected in series with conductors 154, 156 coupleable to a power source 158. Insulator layer 160 electrically insulates conductors 154, 156. Conductors are formed of an electrically conductive material such as copper and the soldering portion 152 is formed of a relatively resistive material, such as a steel material. A voltage potential is supplied across conductors 154, 156 to provide current through portion 152 to heat portion 152 for soldering operation. Conductors 154, 156 are adapted to couple to a support fixture (not shown) for soldering operation.

As shown, soldering portion 152 includes an elongated hot bar 158 having spaced opposed ends 160, 162 supported by flexible legs 164, 166 for incline adjustment. Ends 160, 162 of the hot bar 158 are connected in series with conductors 154, 156 via legs 164, 166. A base 168, 170 of legs 164, 166 is secured to stepped ends 172 of conductors 154, 155 via connection pins 174 as illustrated in FIGS. 4–5. An extent of the hot bar 158 between opposed ends 160, 162 defines a length 176 of the hot bar 158 and the hot bar includes a traverse width 178 as illustrated in FIG. 6. The length 176 of the hot bar 158 is sized to align with a series of solder pads 104 for concurrently soldering a series of connections A plurality of spaced soldering tips 180-1–180-5 are formed along the length 176 of the hot bar 158. In the embodiment shown, soldering tips 180 are equally spaced and are spaced to align with a series of solder pads 104. A temperature sensor 190 is coupled to the soldering portion 152 to control the soldering temperature for soldering operation as shown in FIG. 6.

Figure 7:
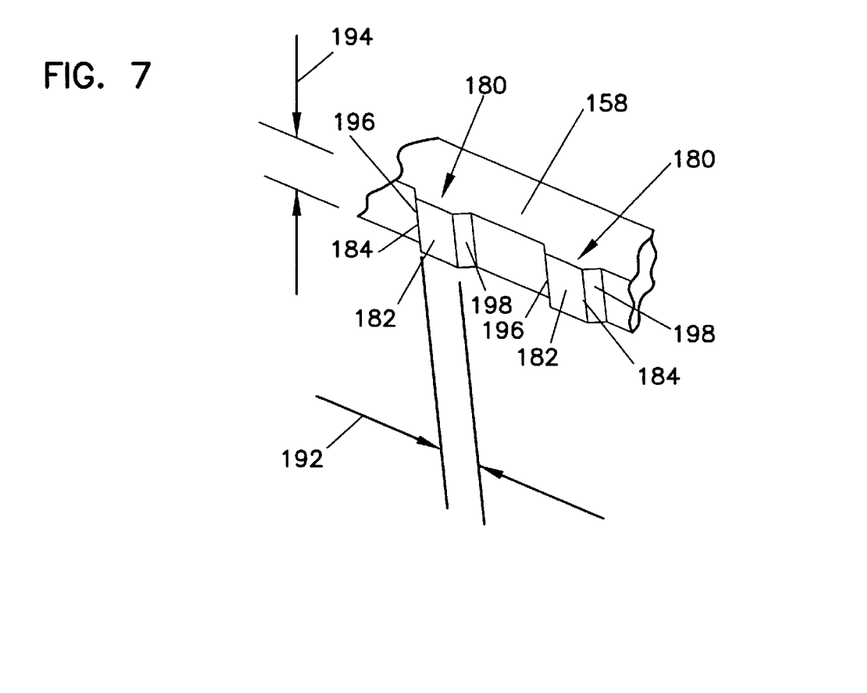
FIG. 7 is a detailed view of section 7 of FIG. 6 illustrating soldering tips.
Figure 8:
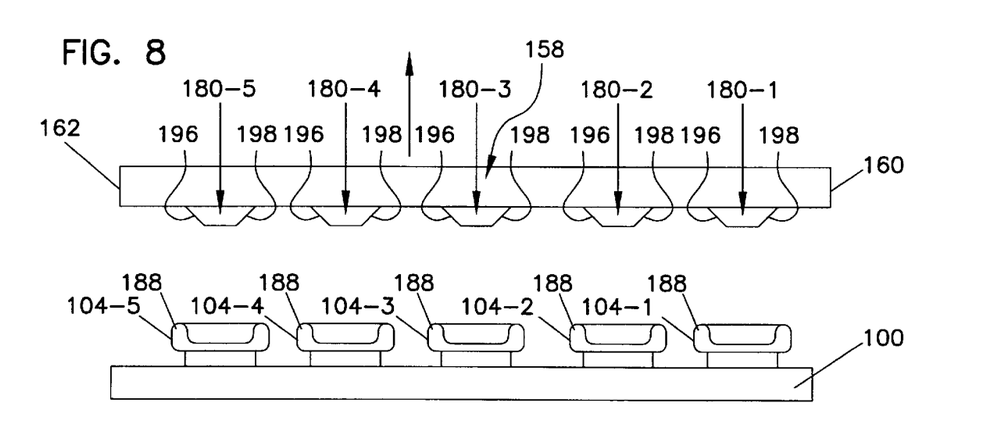
FIG. 8 is side view illustrating soldering operation for the device illustrated in FIGS. 4–6.
Figure 9:
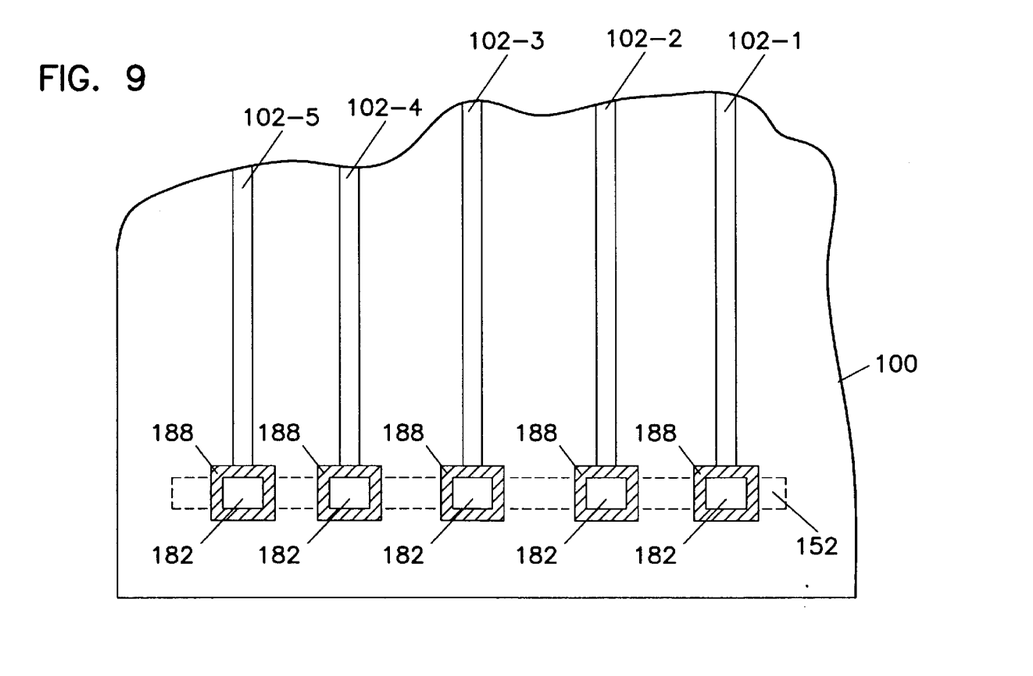
FIG. 9 is a top view of a soldering operation for the device illustrated in FIGS. 4–6.

As shown in more detail in FIG. 7, the soldering tips 180 include raised soldering surfaces 182 elevated from hot bar 158. In the embodiment shown, an area of the soldering surface is sized so that an outer perimeter dimension 184 of the soldering surface is smaller than an outer perimeter dimension of solder pads 104 to form rims 188 about solder pads 104 via contact between soldering tips 180 and solder pads during soldering operation as illustrated in FIGS. 8–9.

In the embodiment illustrated in FIG. 7, soldering tips 180 include a rectangular raised soldering surface 182 having a length and width dimension 192, 194. As shown in FIG. 7, the width dimension 194 corresponds to the width of the hot bar 158 and both the length and width dimension 192, 194 are sized smaller than an outer periphery of a solder pad to form rim 188 about solder pad 104 via contact between soldering tips 180 and solder pad during soldering operation. As shown in FIGS. 7–8 in one embodiment sides 196, 198 of soldering tips 180 are sloped inwardly toward elevated soldering surface 182.

For soldering operation, soldering tips 180-1–180-5 contact solder pads 104 to heat the solder to form an electrical connection. As shown in FIGS. 8–9, soldering tips 180 contact a center portion of solder pads 104 to form raised rims 188 about an outer periphery of the solder pads 104. Displaced solder collects at raised rims 188 to reduce solder flow or spill which interferes with or shorts electrical connections between circuit portions 100, 106. The limited contact area of the soldering tips 180 reduces solder flow from the solder joint. Significant solder flow from the solder joint can create a weak solder connection.

Figure 10:
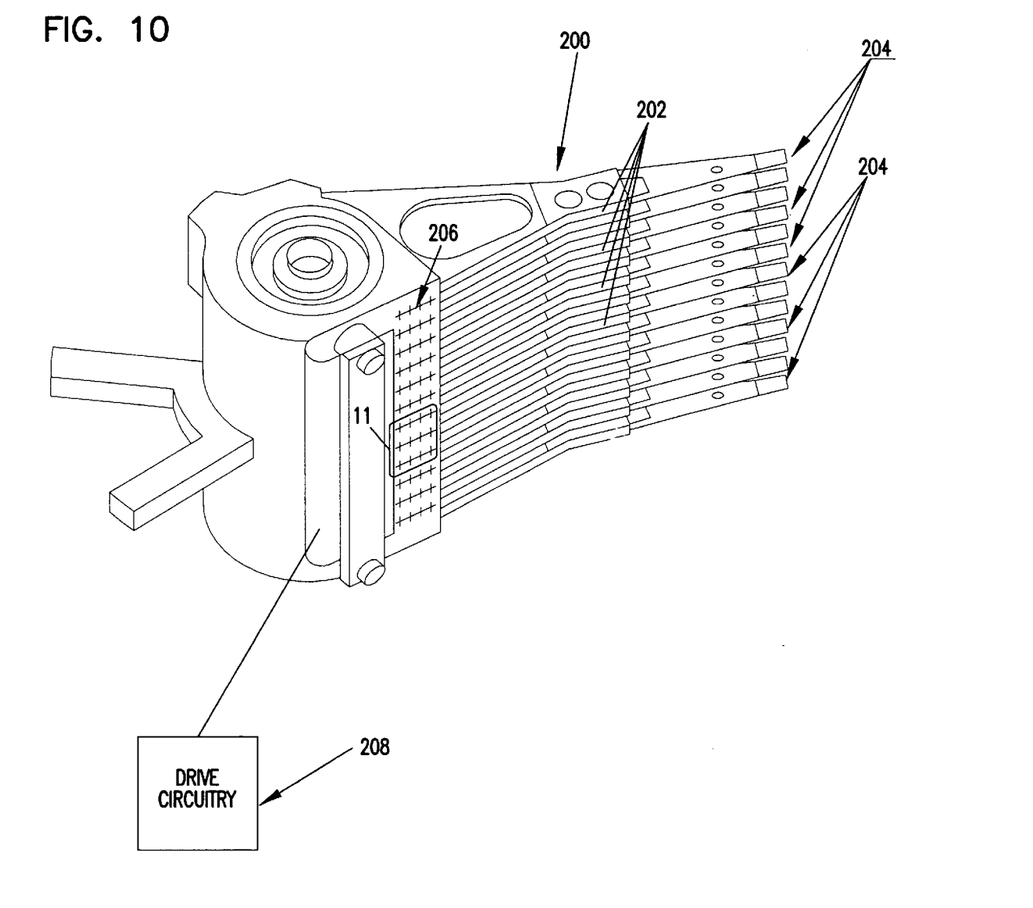
FIG. 10 is a perspective view of an E-block of a disc drive.

The soldering device of the present invention has particular application for soldering lead wires from transducer heads to an E-block 200 shown in FIG. 10 of a disc drive (not shown). FIG. 10 illustrates an E-block 200 which includes a plurality of spaced stacked actuator arms 202 supporting a plurality of heads 204 to read data from or write data to a disc (not shown). Transducers of heads 204 are electrically coupled to a printed circuit 206 supported by E-block which is coupled to circuitry of the disc drive as illustrated by block 208.

Figures 11, 12:
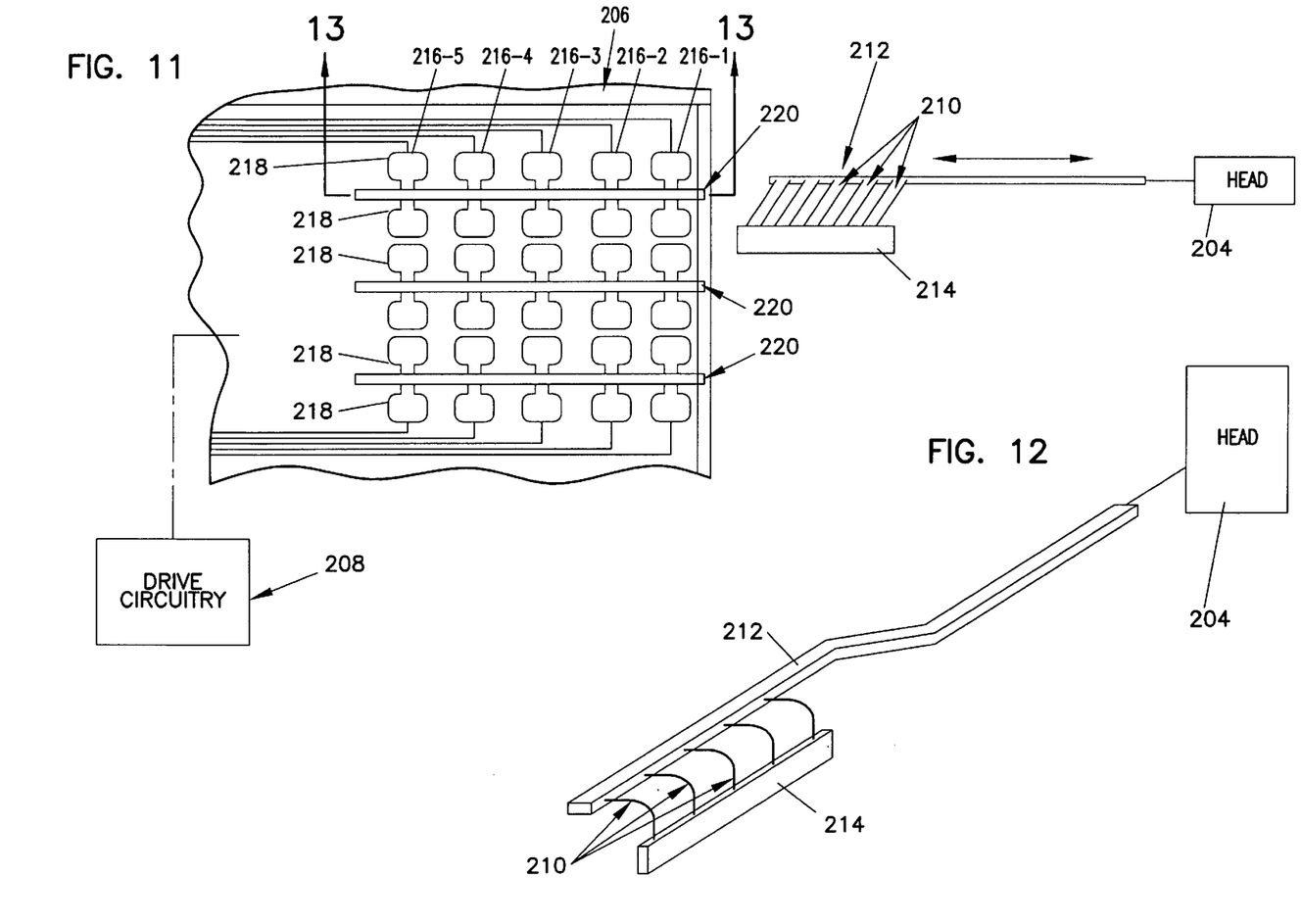
FIG. 11 is a detailed view of portion 10 of FIG. 10 illustrating connection of leads to E-block circuitry.
FIG. 12 is a detailed perspective view of a flex circuit for head leads.

FIG. 11 is a detailed view of portion 11 of FIG. 10. FIGS. 11–12 illustrate connection of head leads 210 to printed circuit 206. Leads 210 for each head 204 are supported by a flexible circuit 212. Ends of leads are connected to shunt 214 prior to assembly to protect leads for shipping and handling and prevent electro-static discharge (ESD). For drive operation, leads 210 for each head are connected to a series of closely spaced solder pads 216-1, 216-2, 216-3, 216-4, 216-5 aligned along a common axis.

E-block 200 includes multiple closely spaced rows 218 of solder pads. Each 218 row of solder pads 216 as shown in FIG. 11 includes a plurality of spaced solder pads 216-1, 216-2, 216-3, 216-4, 216-5 for electrically connecting multiple lead wires for each head in the E-block 200. The number of rows of solder pads corresponds to the number of heads 204 supported by the E-block 200 to read data from and write data to a disc stack (not shown). The number of leads 210 depends upon the number of connections required for transducer elements of the heads 204 and application of the invention is not limited to the particular number of series connections shown.

Figure 13:
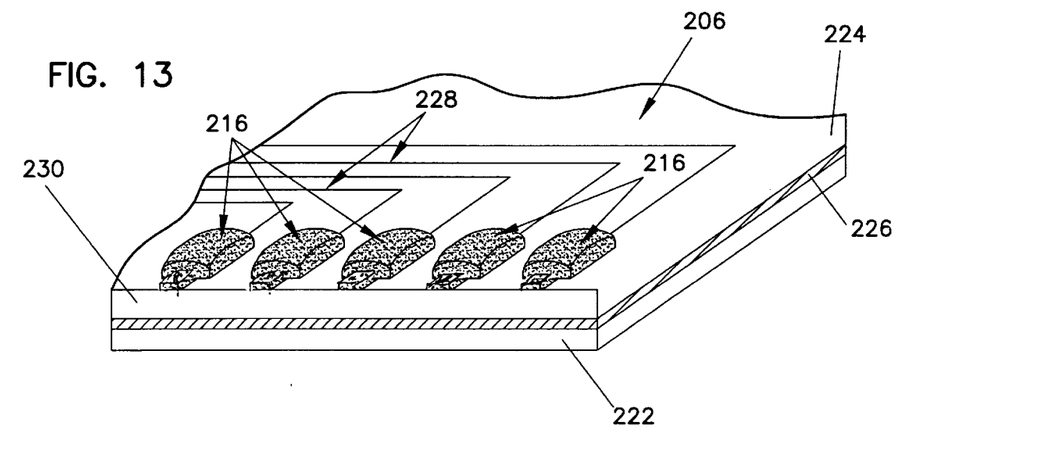
FIG. 13 is a perspective view as taken along line 13—13 of FIG. 11 prior to soldering leads.

As shown in FIG. 12, flex circuits 212 for heads 204 are inserted into slots 220 of circuit portion 206. Leads 210 are bent as shown in FIG. 12 to align with a row of solder pads 216-1, 216-2, 216-3, 216-4, 216-5. Thereafter, a soldering device solders leads 210 to solder pads 216. FIG. 13 is a schematic illustration of the composite structure of circuit 206 supported by E-block 200 as taken from slot 220 from lines 13—13 of FIG. 11. Circuit 206 includes the stiffener plate 222 and a flexible layer 224 connected to a stiffener plate 222 by an adhesive layer 226.

Figure 14:
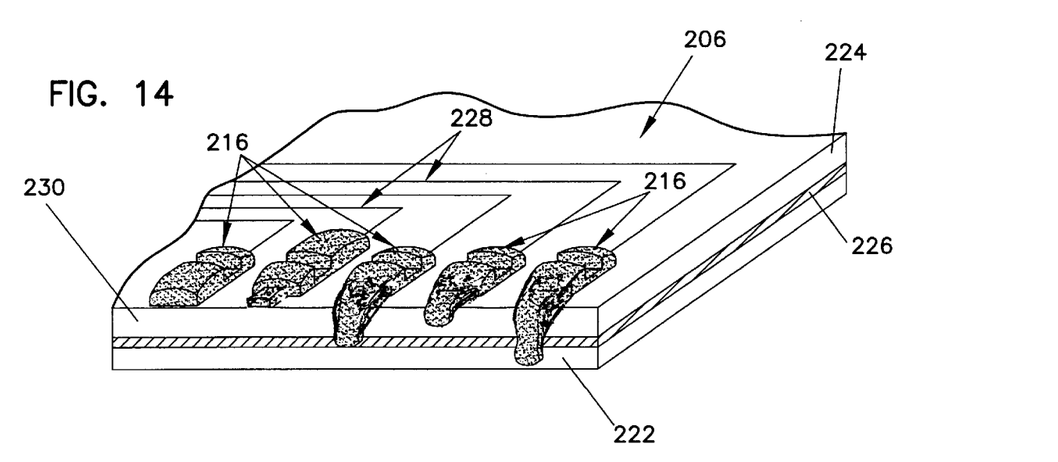
FIG. 14 is similar to FIG. 12 illustrating soldering operation of a prior art soldering bar.

Solder pads 216 and conductive traces 228 are formed on flexible layer 224. Preferably, stiffener plate 222 is formed of a metal plate and the flexible layer is formed of a plastic film material, such as a polyimide material, for example, "Kapton", which is a trademark for a polyimide product manufactured by E. I. DuPont De Nemours Company of Wilmington, Del., As shown schematically in FIG. 13, solder pads 216 abut an edge 230 of slot 220. In prior soldering operations utilizing an elongated soldering bar having an elongated soldering surface solder flow can spill over edge 230 and contact stiffener plate 222 which can short the circuitry as illustrated schematically in FIG. 14. Further solder displaced by the planar soldering bar can weaken the solder connection of leads 210 to the solder pads 216. After leads 210 are soldered to pads 216, shunt 214 is removed. Removal of shunt 214 can further weaken the lead connections.

Figure 15:
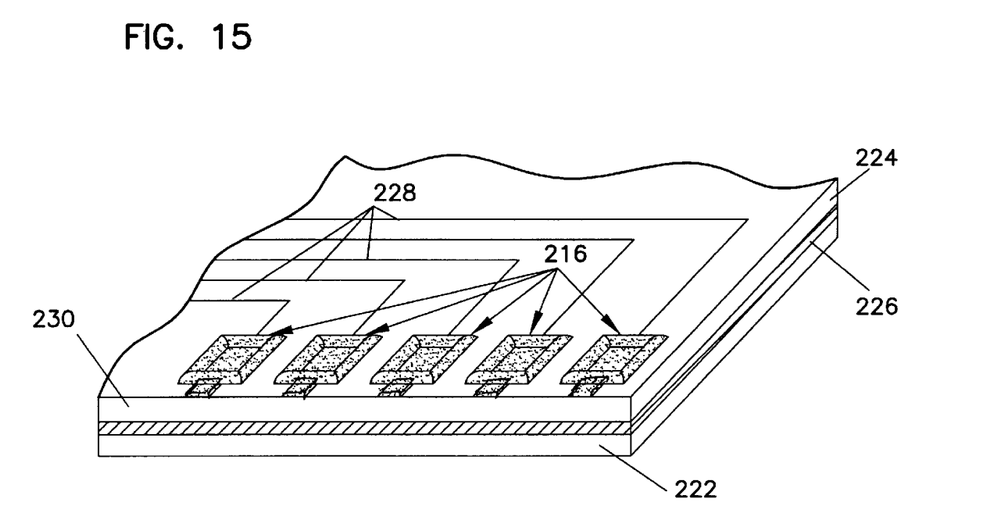
FIG. 15 is similar to FIGS. 13–14 illustrating soldering operation using a soldering device having a plurality of soldering tips supported along an elongated hot bar.

In the soldering device described in FIGS. 4–6, only the elevated soldering surface 182 of the soldering tips 180 contacts solder pads 216 to form rims 188. As illustrated schematically in FIG. 15, connection of leads 210 to pads 216 via elevated tips 180 reduces solder flow or spill to reduce spill over to metal stiffener plate 222 which can short the connection between heads 204 and the drive circuitry 208. Also reduced solder flow provides a stronger connection between leads 210 and drive circuitry 208.

Figure 16:
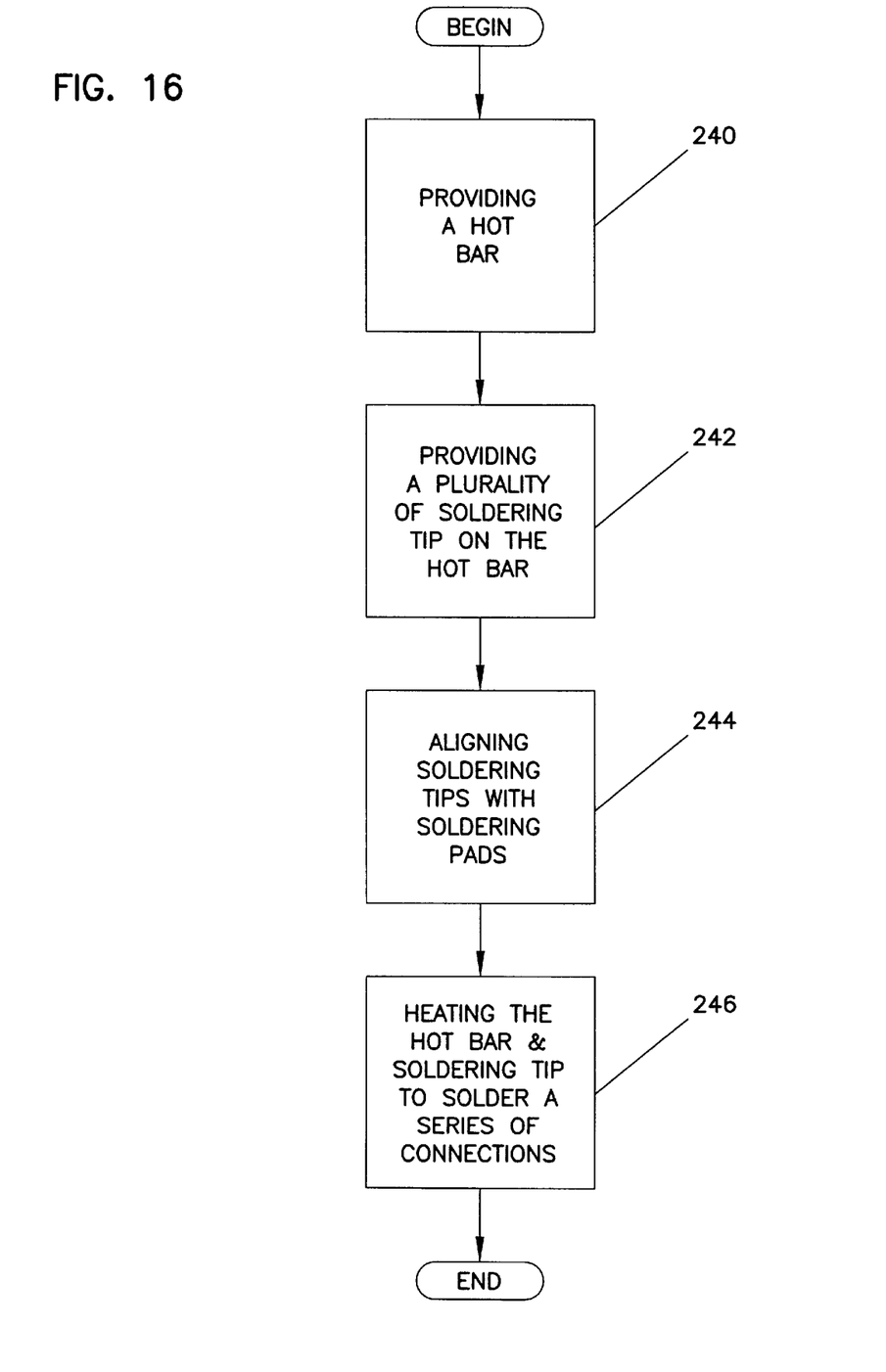
FIG. 16 is a block diagram of an embodiment of a soldering operation of the present invention.

Thus, as described, soldering device 150 of the present invention includes an elongated hot bar 158 formed of a relatively resistive material and a plurality of spaced soldering tips 180 supported along the hot bar for soldering multiple connections. For use, as illustrated in FIG. 16, hot bar, including a plurality of soldering tips, are aligned with soldering pads as illustrated by blocks 240, 242 and 246. The soldering bar and soldering tips 180 are heated to solder a series of connections as illustrated by block 246.

Although the invention has been illustrated with reference to connecting circuitry coupled to transducer elements of heads to circuitry of a disc drive, it should be understood that the invention is not limited to the specific application shown and that the soldering device described according to the invention may be used to solder any circuit portions including a plurality of connectors. Additionally, although the present invention is described for flexible circuit portions, it should be understood that the invention is not specifically limited to flex circuit portions.

It is to be understood that, even though numerous characteristics and advantages of various embodiments of the present invention have been set forth in the foregoing description, together with details of the structure and function of various embodiments of the invention, this disclosure is illustrative only, and changed may be made in detail, especially in matters of structure and arrangement of parts, within the principles of the present invention to the full extent indicated by the broad general meaning of the terms in which the appended claims are expressed. For example, the particular elements may vary while maintaining substantially the same functionality without departing from the scope and spirit of the present invention. In addition, although application of the soldering device is described for soldering head leads coupled to transducer elements of heads to circuitry of a disc drive, it will be appreciated by those skilled in the art that the soldering device and teachings of the present invention can be applied to solder various circuit portions without departing from the scope and spirit of the present invention and is not limited to head leads or disc drives.

What is claimed is:

1. In combination:

a series of spaced solder pads having perimeter edges;

an elongated hot bar formed of a relatively resistive material and having opposed terminals coupleable to a power source; and a plurality of spaced soldering tips along the hot bar including raised soldering surfaces enclosed by elevated perimeter edges spaced from the hot bar and the elevated perimeter edges of the soldering surfaces being sized smaller than perimeter edges of the solder pads to form a solder connection having a solder rim about a perimeter of the solder connection.

2. The combination of claim 1 wherein the soldering surface is rectangular shaped.

3. The combination of claim 1 wherein the hot bar has spaced opposed ends defining a length of the hot bar and a width transverse to the length, and the soldering tips have a width dimension sized equal to or smaller than the width of the hot bar.

4. The combination of claim 1 wherein the soldering tips are equally spaced.

5. The combination of claim 1 wherein the soldering tips include sloped sides extending from the hot bar to the raised soldering surface.

6. The combination of claim 1 including a temperature sensor coupled to the hot bar.

7. The combination of claim 1 wherein the opposed terminals of the hot bar are at spaced opposed ends of the hot bar.

8. The combination of claim 1 wherein the hot bar is connected in series with a first conductor and a second conductor coupleable to a power source.

9. The combination of claim 1 wherein the spacing between soldering tips along the hot bar corresponds to spacing between solder pads on an E-block circuit for connecting lead wires from transducer elements to circuitry of a disc drive.

10. A soldering device comprising:

an elongated solder bar having opposed terminals connectable in series to a power source; and means for soldering a plurality of spaced connections.

11. A method of soldering a series of connections, comprising steps of:

(a) providing a hot bar formed of a relatively resistive material;

(b) providing a plurality of spaced soldering tips supported along a length of the hot bar;

(c) aligning the soldering tips relative to a series of solder pads;

(d) heating the hot bar and soldering tips; and (e) soldering a series of solder connections having a solder rim surrounding the solder connection.

12. The method of claim 11 comprising the step of:

(f) positioning the hot bar relative to multiple rows of solder pads for soldering head leads to an E-block.

13. A series of solder connections comprising:

a plurality of spaced solder pads including a soldered portion electrically connecting leads to a circuit; and a solder rim enclosing the soldered portion.

* * * * *